1
UNITED STATES PATENT OFFICE.

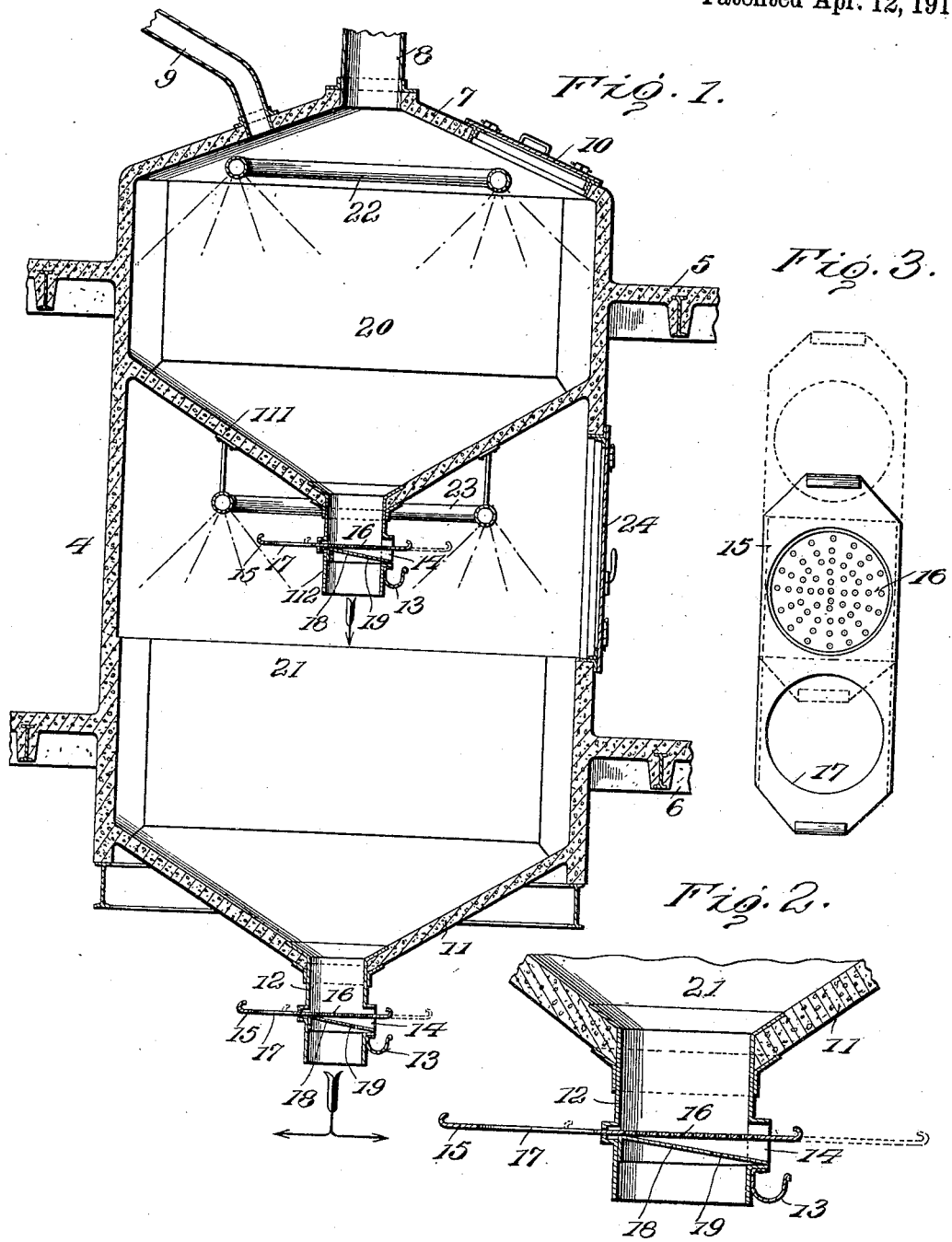

JOSEPH SCHNEIBLE, OF CHICAGO, ILLINOIS.

PROCESS OF MALTING.

954,889.  Specification of Letters Patent. Patented Apr. 12, 1910.

Application filed November 16, 1908. Serial No. 462,767.

*To all whom it may concern:*

Be it known that I, JOSEPH SCHNEIBLE, a citizen of the United States, residing at Chicago, in the county of Cook and State of Illinois, have invented a new and useful Improvement in Processes of Malting, of which the following is a specification.

My invention relates to an improvement in the art of malting; and its primary object is to simulate nature, in the practice of artificially preparing the grain for the usual treatment on a germinating floor or in a germinating apparatus, by omitting the usual step of steeping the grain. Steeping necessarily involves submerging the grain in the water for soaking it therewith. Air is unavoidably excluded from access to the grains while they are thus submerged, so that the water they absorb in soaking expels the gases naturally contained in them, thereby leaving them, in their soggy condition, devoid of the gases required to promote their initial growth. Before air can act on the soggy grains it must necessarily displace part of the water with which they are soaked by steeping. This requires considerable time, during which deterioration of the grains is liable to occur before they germinate, particularly since the steeping for from 24 to 48 hours, as is usual, effects extraction out from the grains, by the steep-water of more or less of their contained nutritious matter necessary to proper germination, thereby leaving them in a weakened condition. Besides, as a frequent effect of steeping, parts of the starchy bodies of the grains remain in a condition unfavorable to the action on the starch which takes place in the germinating step, with the result that portions of the starchy bodies remain in the finished malt as flint-like particles and are detrimental to the quality and value of the product. Moreover, steeping has the further objection of impairing the enzymatic action on the albuminous matter in the grains, thereby causing, in beverages produced from the malt, troublesome clarification and inferior foam-producing properties.

My improvement involves supplying the necessary moisture to the grains in the presence of air and in quantity sufficient to merely moisten by absorption their bodies without expelling therefrom their contained air, but retaining it therein and adding to it air which is absorbed with the applied moisture. In this way the procedure simulates nature in corresponding to the growth of the grains when planted in soil, since, under proper conditions of the soil they absorb therefrom only sufficient moisture to promote germination and this without loss of the gases and other substances inherently contained in the grains and required for promoting their initial growth.

Apparatus suitable for the practice of my improvement is illustrated in the accompanying drawing, in which—

Figure 1 is a broken view in vertical sectional elevation, showing two receptacles for the grain to be malted, preparatorily cleaned by washing it, one receptacle surmounting and being adapted to be evacuated into the other, and each being equipped with a valve-device for controlling the discharge from it and with a sprinkling attachment; Fig. 2 is an enlarged broken section illustrating the construction of the valve-controlled hopper-bottom, which is the same on each receptacle, and Fig. 3 is a plan view of the valve-device.

For the proper equipment of a malting-plant a plurality of the duplicate receptacles illustrated are required to be used, but the one set shown will suffice for the explanation herein of my invention.

The holder 4, of preferred rectangular shape in cross-section and which is best formed of molded concrete or constructed of wood because of the temperature-insulating properties of these materials, is supported, as represented, to extend through successive floors 5, 6, of an inclosure or building (not shown). The holder has a sloping top or cover 7 containing an opening in its apex for a vent-pipe 8, an opening to which a feed-pipe 9 leads, and a manhole provided with a removable cover 10; and the bottom 11 of the holder is of hopper-shape with a discharge-spout 12 leading from its apex and provided on its outer side with a gutter 13 adjacent to a lateral water-outlet 14 in the spout. A slide-valve 15 is supported in the discharge-spout 12 to pass transversely through it. It contains a circular perforated section 16 to register with the spout 12 in one (the outermost) position of the valve and an outlet-opening 17 to register therewith in the innermost position of the valve, indicated by dotted representation; and the slide-valve carries on its bottom a trough 18 registering with the perforated section 16 with its bottom 19 inclining to the base of the outlet 14 when the perforated section of the valve registers with the spout. The holder 4 is divided by a partition 111, like the bottom 11, into upper and lower receptacles or compartments 20 and 21, this partition being provided with a valve, gutter and trough equipped discharge-spout 112, the details of which are counterparts of the similarly equipped discharge-spout 12. In the respective compartments are supported sprinkling pipes 22 and 23 for spraying water upon the grain, each having a valve-controlled connection (not shown) with any suitable water-supply; and the compartment 21 is provided with a door 24 through which to gain access to it.

To practice my improved process with the described apparatus, the grain (as barley) is thoroughly washed, as usual, care being taken to avoid any such subjection of the barley to the water in washing as would tend to soak it. The washed grain is fed, in superficially moist condition from the washing, to the compartment 20 through the pipe 9, the slide-valves in the spouts having preparatorily been adjusted to register their perforated sections with the respective discharge-spouts. Periodically—say at intervals of about six hours—water is turned on through the sprinkler 22 to sprinkle grain with which the compartment 20 is filled, sufficient water being used for each sprinkling operation to keep the grains in superficially moist condition; and as the moisture becomes absorbed into the interior of the grains, together with air from their surroundings in the holder, the sprinkling is repeated, any surplus water running off through the perforated valve-section into the trough and escaping by way of the gutter to a sewer.

As turning the barley is beneficial in enhancing uniformity in the sprouting it is preferred to effect the turning by the act of discharging the grains into the compartment 21 since thereby the capacity of the apparatus is doubled and the apparatus is simplified, although the entire process constituting my non-steeping improvement might, as will be understood, be carried on in a holder containing only one compartment. To effect transfer of the moist grains from the compartment 20, the slide-valve in its discharge-spout is adjusted to register therewith its opening 17, thereby permitting the grains to fall into the lower compartment and be "turned" in thus falling. On readjusting that valve to its normal position, namely with its perforated section in registration with the discharge-spout, the upper compartment is ready to receive another supply of washed barley to be treated in the manner described; and the partly treated grains in the lower compartment are subjected, at suitable intervals, to wetting from the sprinkler 23, in the presence of the air surrounding them, surplus water escaping into the gutter 13 on the spout 12 through the perforated section 16 by way of the trough 19. When the initial germination of the grains in the lower holder-compartment has proceeded to the desired extent, under subjection to the sprinkling and moist-air treatment, the valve 15 is adjusted to register its opening 17 with the spout 12 to permit discharge of the grains through the latter, whence they are transferred to any known or suitable apparatus for completing the sprouting thereof.

It is of advantage to maintain the contents of the holder at normal temperature of about 60° to 70° F., which may be accomplished, as one way, by using the sprinkling water in a condition that will produce and maintain that temperature in the holder; and to this end the construction of the holder of insulating material is of advantage.

To bring barley to the desired state of initial germination preparatory to discharging it from the compartment 21 requires from 24 to 36 hours, the time being divided equally between the two compartments.

While it is essential to my improvement that the wetting of the grains shall take place in the presence of atmospheric air, this is not to be understood as implying any free or copious circulation of air through the grain-mass, since that would tend to dry out some of the grains, and thus impair uniformity in their growth; but the treatment in the presence of air means the air must be present with the applied surface-moisture to act with the latter upon the grains, which can not be when the grains are submerged in steeping them.

As a result of my improved non-steeping treatment respiration of the grain is permitted throughout the moisture absorbing period, thus causing the sprouting to take place under natural conditions, since through the respiration of the grain while being moistened in the presence of air the required nitrogen is supplied to the grain, which nitrogen, when sprouting in the absence of air, must be obtained from the nitrogenous constituents of the grain by decomposition. In permitting free respiration of the grain during the moisture absorbing period the action of the aerobic bacteria in preference to the anaerobic bacteria which thrive in the absence of air, is stimulated, these forming the change desirable in the nitrogenous constituents of the grain for the production of malt beverages. Furthermore, by moistening the grains without keeping them submerged during the operation, osmotic action on the salts of the grain by the water is prevented and the soluble substances natural to the grain are retained.

What I claim as new and desire to secure by Letters Patent is—

1. In malting, the process of moistening the grains preparatory to germination, as distinguished from steeping the grains by submerging the same, which consists in wetting the grains under treatment at intervals with water in quantity sufficient to merely moisten by absorption their bodies without expelling therefrom their contained air, and in the presence of air, for the purpose set forth.

2. In malting, the process of moistening the grains preparatory to germination, as distinguished from steeping by submerging the same, which consists in wetting the grains with water in quantity sufficient to merely moisten by absorption their bodies without expelling therefrom their contained air, and turning the grains under treatment at intervals in the presence of air, for the purpose set forth.

3. In malting the process of preparing the grains for germination, as distinguished from steeping by submerging the same, which consists in wetting the grains at intervals with water in quantity sufficient to merely moisten by absorption their bodies without expelling therefrom their contained air, in a holder in the presence of air and maintaining a substantially uniform temperature in the holder during the treatment, for the purpose set forth.

JOSEPH SCHNEIBLE.

In presence of—
  Chas. E. Gaylord,
  Ralph A. Schaefer.